United States Patent Office 3,560,148
Patented Feb. 2, 1971

3,560,148
PROCESS FOR PURIFYING INDUSTRIAL
SOLUTIONS OF SODIUM ALUMINATE
Louis Tamisé, Douvres-la-Delivrande, and Jacques Millet, Versailles, France, assignors to Pechiney, Compagnie de Produits Chimiques et Electrometallurgiques, Paris, and Societe Appareils et Evaporateurs Kestner, Lille, France
No Drawing. Filed Mar. 15, 1968, Ser. No. 713,315
Claims priority, application France, Mar. 20, 1967, 99,395
Int. Cl. C01f 7/06
U.S. Cl. 23—143
6 Claims

ABSTRACT OF THE DISCLOSURE

A process for the removal of sodium carbonate from aluminate solutions generated during the attack on bauxite with caustic soda for the recovery of alumina, wherein, after the solution is hydrolyzed and the precipitated aluminum trihydrate separated, the solution is processed through a series of evaporators wherein the concentration and temperature are increased and a series of expansions in which the suspension is concentrated and cooled to a temperature within the range of 50° to 60° C. and a concentration of 300–330 grams per liter of total $Na_2O$ with the accompanying precipitation of sodium carbonate as fine crystals and adding a concentrated solution of caustic soda to the suspension to raise the total $Na_2O$ content to about 350 grams per liter whereby, without subsequent heating, the sodium carbonate crystals are increased in size for easier separation.

---

This invention relates to the separation of sodium carbonate from solutions of sodium aluminate, such as are often obtained during the preparation of alumina by action of alkali on bauxites.

These solutions contain sodium carbonate, which is derived, for the most part, from the action on the lime contained in the bauxite. The concentration of carbonate is sufficient for precipitation of the concentrated and cold caustic soda solutions.

During the preparation of the alumina, after the attack on the bauxite, separation of the red muds, dilution and hydrolysis in the presence of seed crystals, the solid aluminum trihydrate is separated from a relatively dilute solution of free caustic soda and sodium aluminate, which has to be concentrated to enable reuse for attack on a fresh batch of bauxite.

Heretofore, concentration has been carried out in multi-stage evaporators operating in parallel streams, that is to say, the concentrated solution from the coldest stage is at about 50° to 60° C. with a concentration which may be as high as 300 to 330 g. per liter of total $Na_2O$.

In a previously issued French Pat. No. 1,386,328, dated Nov. 19, 1963, and issued to Pechiney, description is made of a process which brings about an increase in the volume of sodium carbonate crystals whereby separation becomes easier. This process comprises two steps, namely:

(1) Addition of caustic soda in concentrated solution in an amount to raise the concentration of total $Na_2O$ to about 350 g. per liter. This addition causes the appearance of fresh carbonate crystals which are as fine as the first and which do not increase in size.

(2) Heating of the suspension to a temperature within the region of 100° C. A rapid increase in size of the crystals is observed and the separation by decantation and/or filtration becomes very easy.

Since that time, Kestner invented a new type of evaporator which operates in a different way and which forms the subject matter of French patent application PV 87,-504, filed Dec. 15, 1966. In this apparatus, designed to avoid encrustations on the walls of the tubes, the solution to be concentrated enters the coldest last stage and flows countercurrently to the hottest first stage heated by live steam while being concentrated progressively from stage to stage. The solution then passes into a series of expansion separators wherein it is partially vaporized while being cooled. Each of the expansion separators communicates with the corresponding evaporation stage. Finally, the concentrate leaves the last expansion stage at a temperature of 50° to 60° C. and with a concentration of 300 to 330 g. per liter of total $Na_2O$.

During this cooling, fine crystals of sodium carbonate are precipitated in the solution. These crystals no longer spontaneously increase in size.

Although these conditions, as regards temperature and concentration, are the same as those obtained with conventional evaporators, the carbonate crystals, which have crystallized under substantially different conditions, do not have the same properties—a factor which is quite surprising and unforeseeable.

It has been established that when the suspension leaving evaporators of this type has added thereto a concentrated aqueous solution of caustic soda in an amount to increase the content of total $Na_2O$ to about 350 g. per liter, an increase in grain size is produced spontaneously and rapidly at the temperature of the suspension on the order of about 60° C., whereas with suspensions resulting from the conventional practice, it is essential to heat the suspension to 100° C. The separation of the crystals that are formed can be achieved more easily and more economically since the installation and energy for heating the suspension are avoided.

The present invention makes it possible, by combination of the concentration by means of the new evaporator and addition of concentrated caustic soda solution, to adjust the total $Na_2O$ content to about 350 g. per liter, directly to obtain sodium carbonate in the form of large crystals which are easily separated by decantation and filtration. This is a result that has not previously been achieved by such simple means.

The concentration of suspension issuing from the evaporators and the quantity of caustic soda added are calculated to compensate for the loss of sodium in the form of insoluble salts in the red muds. The caustic soda solution used for addition to the carbonate suspension contains 400 to 600 g. $Na_2O$ per liter and comprises about 10% to 20% by volume of the treated suspension.

It will be apparent that we have provided a simple and efficient means for the removal and recovery of sodium carbonate from the treating liquids and it will be understood that changes may be made in the details of formulation and operation without departing from the spirit of the invention, especially as defined in the following claims.

We claim:
1. In a process for the removal of sodium carbonate from aluminate solutions produced by the attack on bauxite with caustic soda wherein the solution is hydrolyzed and the precipitated aluminum trihydrate separated, the step comprising passing the aluminate solution through a series of evaporators in which the solution first enters the hottest stage whereby both the temperature and the concentration of the solution are increased, passing the resulting heated solution into a series of expansion zones whereby the solution is cooled to a temperature within the range of 50° to 60° C. and concentrated to a total $Na_2O$ content within the range of 300 to 330 grams per liter with the accompanying precipitation of sodium carbonate, and adding a concentrated solution of caustic soda to the suspension sufficient to raise the total $Na_2O$ content to about 350 grams per liter whereby the sodium car- bonate crystals are increased in size for easier separation.

2. The process as claimed in claim 1 in which the sodium carbonate crystals separate out as fine crystals from the suspension before the concentrated caustic soda is added.

3. The process as claimed in claim 1 wherein the sodium carbonate crystals increase in size upon the addition of the concentrated solution of caustic soda without subsequent heating.

4. The process as claimed in claim 1 in which the concentrated caustic soda solution added to the suspension has an $Na_2O$ content within the range of 400–600 grams per liter.

5. The process as claimed in claim 4 in which the concentrated caustic soda solution is added in an amount corresponding to 10–20% by volume of the concentrated suspension.

6. The process as claimed in claim 1 in which the caustic soda added to the suspension leaving the separator corresponds to the amount of caustic soda lost in soluble and insoluble form with the red muds of the process.

References Cited

UNITED STATES PATENTS 2,981,600   4/1961   Porter _____ 23—143
3,341,286   9/1967   Mercier et al. _____ 23—143

HERBERT T. CARTER, Primary Examiner

U.S. Cl. X.R.

23—52, 63